United States Patent [19]

Le Van Suu

[11] Patent Number: 5,796,604
[45] Date of Patent: Aug. 18, 1998

[54] SYSTEM COMPRISING A MACHINE FOR THE COMMUNICATION OF PRICING CHANGES

[75] Inventor: Maurice Gilbert Le Van Suu, Romainville, France

[73] Assignee: SGS-Thomson Microelectronics, S.A., Gentilly, France

[21] Appl. No.: 427,033

[22] Filed: Apr. 24, 1995

[30] Foreign Application Priority Data

Apr. 22, 1994 [FR] France .................. 94 05060

[51] Int. Cl.$^6$ .................. G05B 15/00; H02J 15/00
[52] U.S. Cl. .................. 364/132; 364/493; 340/825.06
[58] Field of Search .................. 364/492, 493; 340/825.06; 370/419, 466, 467

[56] References Cited

U.S. PATENT DOCUMENTS

| | | | |
|---|---|---|---|
| 3,911,415 | 10/1975 | Whyte | 340/310.03 |
| 3,942,170 | 3/1976 | Whyte | 340/310.07 |
| 3,962,547 | 6/1976 | Pattantyus-Abraham | 340/310.06 |
| 4,091,361 | 5/1978 | Eichelberger et al. | 340/825.53 |
| 4,130,874 | 12/1978 | Pai | 364/514 C |
| 4,185,272 | 1/1980 | Feiker | 340/829.07 |
| 4,302,750 | 11/1981 | Wadhwani et al. | 340/870.02 |
| 4,446,462 | 5/1984 | Ouellete et al. | 340/825.07 |
| 4,656,593 | 4/1987 | Gleba et al. | 364/492 |
| 4,703,306 | 10/1987 | Barritt | 340/310.08 |
| 4,763,104 | 8/1988 | Inoue et al. | 340/310.01 |
| 4,872,162 | 10/1989 | Tanaka et al. | 370/402 |
| 5,018,138 | 5/1991 | Twitty et al. | 370/94.1 |
| 5,086,385 | 2/1992 | Launey et al. | 364/188 |
| 5,090,024 | 2/1992 | Vander Mey et al. | 375/204 |
| 5,101,191 | 3/1992 | MacFadyen et al. | 340/310.01 |
| 5,406,249 | 4/1995 | Pettus | 340/310.06 |
| 5,452,344 | 9/1995 | Larson | 379/107 |
| 5,495,406 | 2/1996 | Kushiro et al. | 364/140 |
| 5,559,377 | 9/1996 | Abraham | 307/104 |
| 5,576,700 | 11/1996 | Davis et al. | 340/825.16 |
| 5,579,221 | 11/1996 | Mun | 364/188 |

OTHER PUBLICATIONS

J. Mike Surrat, "Integration of Cebus with Utility Load Management and Automatic Meter Reading," IEEE Transactions on Consumer Electronics, vol. 37, No. 3, p. 406 (1991).

*Primary Examiner*—Reba I. Elmore
*Assistant Examiner*—Robert J. Dolan
*Attorney, Agent, or Firm*—Allen, Dyer, Doppelt, Milbrath & Gilchrist, P.A.

[57] ABSTRACT

In a system comprising a communication machine in an installation and a plurality of devices distributed on an information transmission medium, said machine comprises means for the reception of information elements that are present in an electrical power distribution network and represent a change in pricing system. This communications machine also has means to transcribe the information elements on change in pricing system into information elements formatted according to an exchange protocol and means to send out these formatted information elements on the information transmission medium, the devices being capable of receiving these formatted information elements.

26 Claims, 3 Drawing Sheets

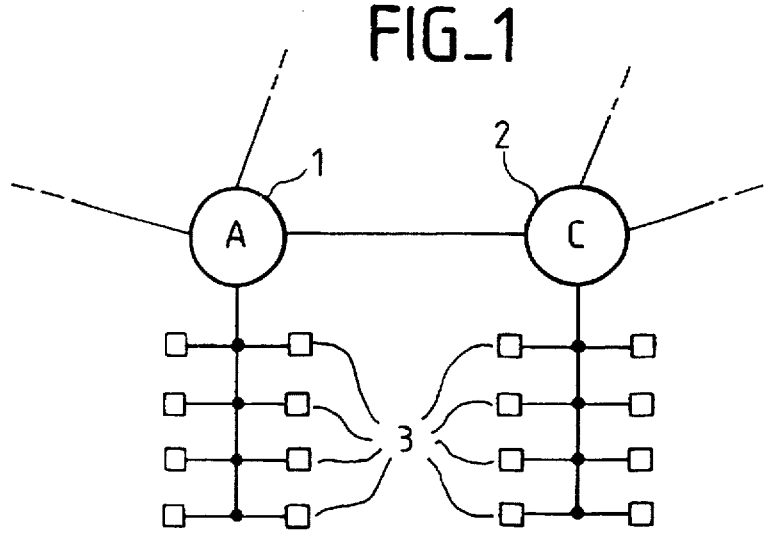
FIG_1
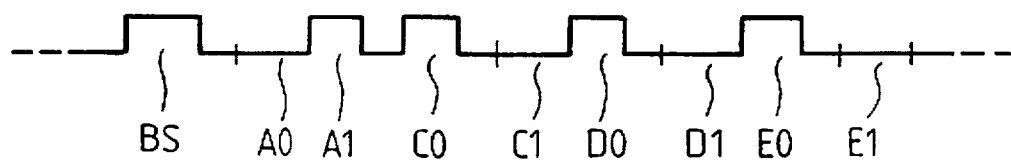
FIG_2
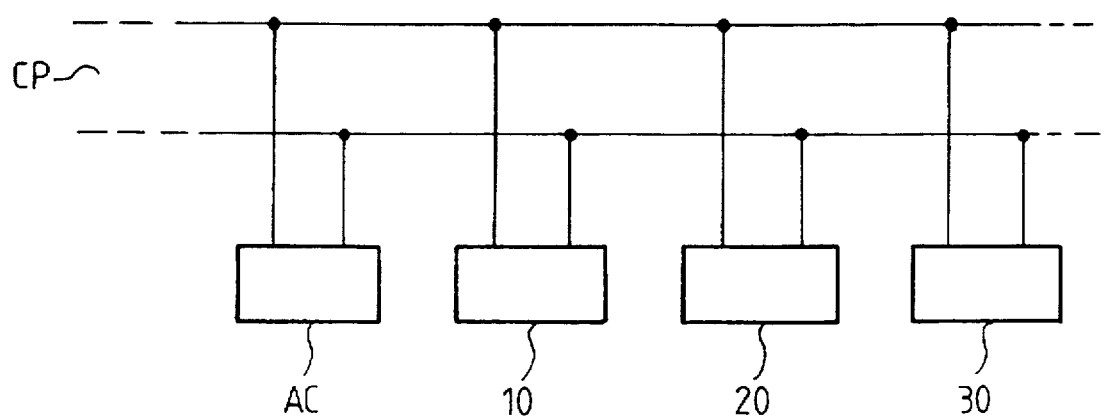
FIG_3

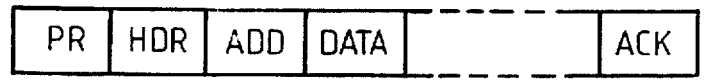
FIG_4
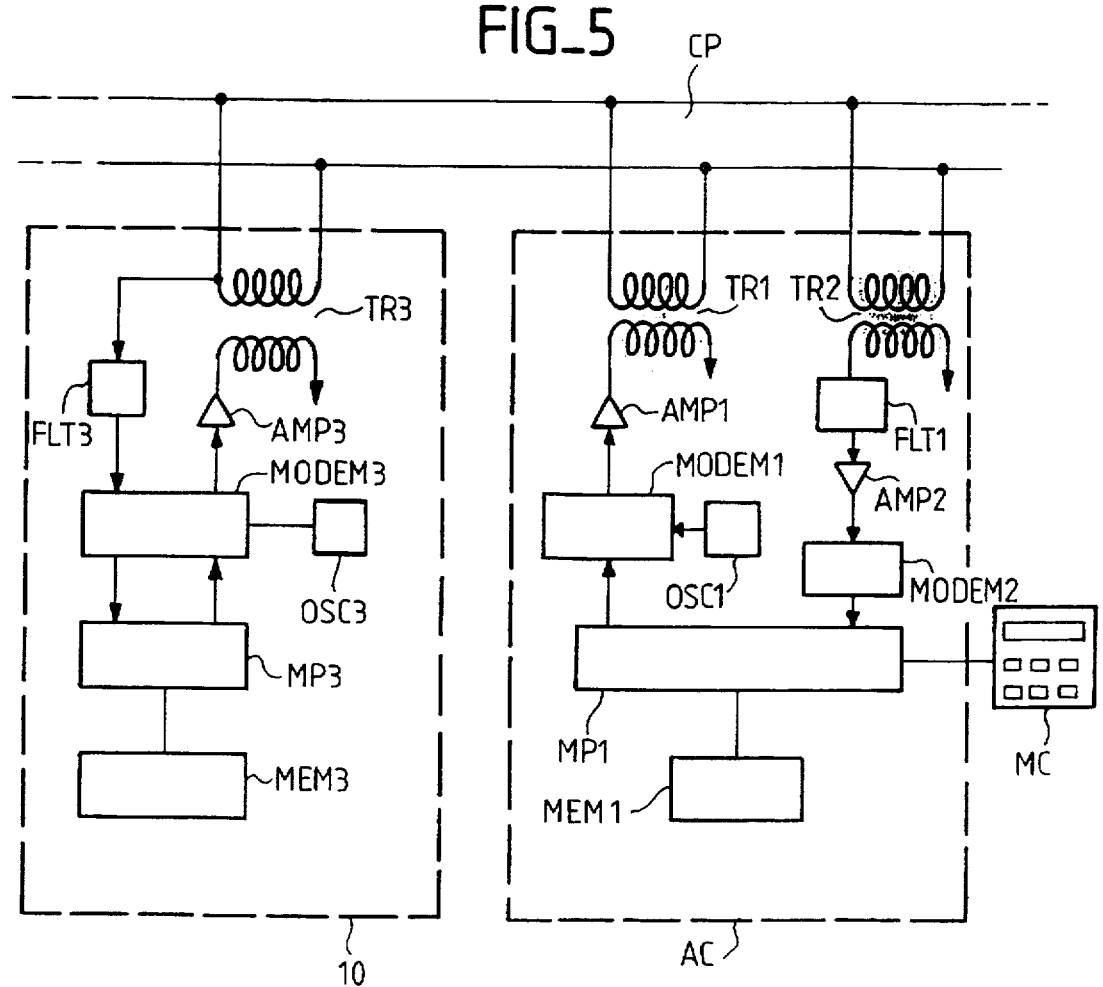
FIG_5

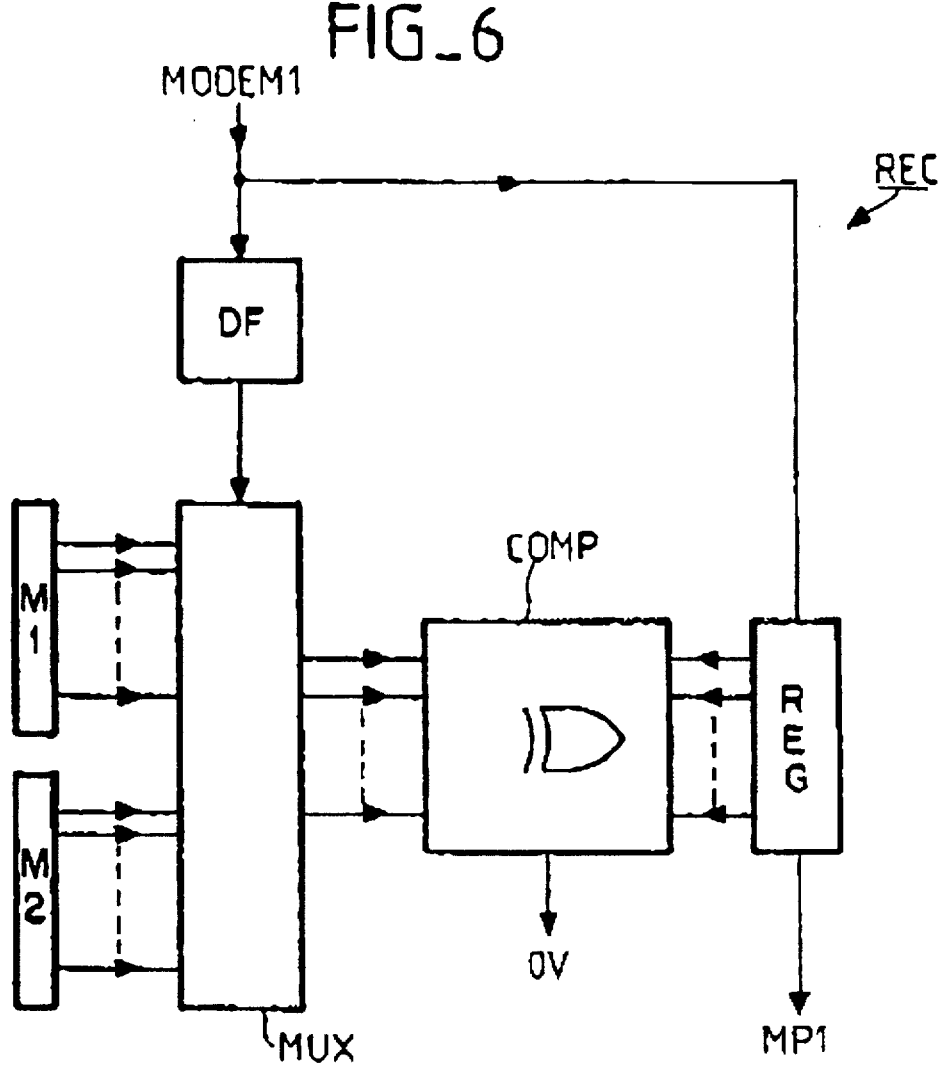

SYSTEM COMPRISING A MACHINE FOR THE COMMUNICATION OF PRICING CHANGES

CROSS-REFERENCE TO RELATED APPLICATION

This application claims priority from French App'n 94-05060, filed Apr. 22, 1994, which is hereby incorporated by reference. However, the content of the present application is not necessarily identical to that of the priority application.

BACKGROUND AND SUMMARY OF THE INVENTION

The present invention relates to a system for the detection and communication of pricing changes in an installation comprising a plurality of devices distributed over an information transmission medium.

The invention can be applied to particular advantage in the management of computerized home automation networks.

Computerized home automation networks generally comprise a plurality of machines distributed over an information transmission line. These machines may be domestic appliances or machines proper such as television sets, refrigerators, washing machines, radiators, etc., or again one or more control stations designed to receive instructions or information elements pertaining to the working of the other machines. These instructions are, for example, on or off commands coming from a user or from the machines themselves. In turn, the control stations or stations send commands to the other machines of the installation in the form of a message used to obtain the desired modifications of operation.

To send these commands, usually various types of media are used for the information transmission line: these media are, for example, carrier current, coaxial cables, twisted pairs, infrared radiation and RF links as well as optical fibers, ultra-sound etc. Although it can be applied very widely, the invention relates more specifically to carrier current, which is the preferred medium for domestic installations.

The installation envisaged here may be of the centralized intelligence type with a control station exchanging messages with other machines that fulfil the role of slave stations. In an installation of the distributed intelligence type, each machine can play the role of master or slave by self-programming without going through a control station which, for its part, only listens to the messages.

The machines designed to be integrated into a home automation installation have, up till now, been designed by the manufacturers to work in a given reception configuration defined by a speed of transmission of control messages that depends on the type of machine concerned. Thus, heating machines may work with a relatively low speed of 300 baud, this speed being however markedly insufficient for illumination devices which require a substantially higher transmission speed of at least 2,400 baud.

In order to enable these different machines to coexist in one and the same information transmission medium, steps began to be taken in 1991 to bring the different systems into harmony, these steps being aimed at laying down a single transmission speed of 1,200 baud. However, it must be expected that, in a relatively near future, machines working at higher information transmission speeds, 2,400 baud for example, will have to be connected to installations meeting the present standard.

This is why, in order to obtain the fullest compatibility, the trend is towards the development of machines that can send and receive messages at a minimum of two information transmission speeds. A data transmission system in an installation of this type comprising machines of this type is described in the European patent application No. 93 401231.1, which corresponds to U.S. Pat. No. 5,400,330.

Furthermore, with respect to the pricing system for electricity, there are systems of operation with modulated pricing. Thus, in France, the French electrical power authority, Electricite de France (EDF) has been proposing a system of this type since 1956. The pricing differs according to whether the consumption is done in a so-called "peak hour" period or in another period known as an "off-peak" or "slack period". In practice, the peak hours correspond to those times of the day when consumption is the greatest, approximately between 6:00 AM and 10:00 PM. The off-peak hours correspond to the low consumption time, approximately between 10:00 PM and 6:00 AM. In order to try to distribute the total consumption as uniformly as possibly throughout the day, the EDF has been proposing lower prices during off-peak hours than during peak hours. By encouraging the customer to make savings, the EDF has thus been attempting to lower its production costs (costs of starting up the alternators of hydroelectric power installations for example) and, secondarily, to prevent possible saturation of the distribution network giving rise to load-shedding operations.

At present the pricing information is processed and used in instruments (counters, remote-control relays) that are accessible only to EDF staff in order to prevent fraud. The information relating to the pricing system comprises a 41-bit frame encoded in RZ (return to zero) mode, having a duration of 103 seconds, the binary 1 information elements being represented by the presence of a modulation frequency of 175 Hz.

In practice, a remote-control relay comprises filtering means used to detect the presence of a modulation on the network, digitization means to convert the received signal into sequences of binary pulses, and a microprocessor to make use of these information elements. When a signal relating to the changing of a pricing system is received, a coil is activated and modifies an indicator at the counter. This indicator then modifies the incrementation of the energy consumption counter by increasing the speed of incrementation if there is a passage into peak time or by reducing it if there is a passage into off-peak time.

Users are given the possibility of linking up with the remote-control relay to benefit from the information. This is done by means of a connector that permits the control of a low-power relay. For this operation, it is necessary to make use of the services of a specialist fitter and to have permission from the EDF to open this relay. Furthermore, additional cables which go up to the relay have to be installed. This possibility offered is therefore impractical and costly. Users therefore are preferring to turn towards programmable packs fitted with an internal clock that makes it possible, for example, to start up and stop a machine (for example a water heater) at fixed times, for example at 11:00 PM and 6:00 AM. This type of pack can be installed without EDF permission but does not have the precision of the remote-control relay. Indeed, the information representing the change of schedule is not, in practice, sent at a precise instant but during a certain time slot.

There is therefore a non-zero probability that a machine will be turned on by means of a programming pack at a time when the pricing system has not yet gone into off-peak time mode or of not stopping it when the system has gone into peak time mode.

Furthermore, in the context of a home automation installation, there is no provision made for the remote-control relay to communicate with the machines: for there would then arise a problem relating to the definition of such a relay since the home automation installations use a very large variety of transmission media and exchange protocols.

There therefore exists a variable pricing system that provides the possibility of the most economical management of its energy consumption. However, for practical and economical reasons, this possibility is little exploited at present.

The invention is aimed at proposing a technical solution that enables the management, independently of the distributors of electrical power, of information elements relating to pricing systems sent by these electrical power distributors on an electrical distribution system.

Thus, the aim of the present invention is to propose a system comprising a plurality of devices distributed on an information transmission medium and a communications machine, said machine comprising means for the reception of information elements that are present in an electricity distribution network and that represent a change in a pricing system, wherein the communications machine has means to transcribe the information elements on change in pricing system into information elements formatted according to an exchange protocol, means to send out these formatted information elements on the information transmission medium, and wherein the devices comprise means for the reception of these formatted information elements.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1 is a diagram representing an electrical distribution network.

FIG. 2 gives the typical composition of a message representing an information element relating to a pricing change.

FIG. 3 is a diagram representing an installation comprising devices distributed on a carrier current line.

FIG. 4 gives the typical composition of a message to be transmitted between two devices of FIG. 3.

FIG. 5 is a diagram of a first machine designed to process the information on pricing change and a receiver device receiving said information formatted by the first machine according to the exchange protocol of FIG. 4.

FIG. 6 is a drawing of a speed recognition means of a relaying device.

DETAILED DESCRIPTION OF THE PREFERRED EMBODIMENTS

The numerous innovative teachings of the present application will be described with particular reference to the presently preferred embodiment (by way of example, and not of limitation), in which:

FIG. 1 gives a schematic view of an electrical distribution network. This network comprises stations of the utility through which the subscribers are connected to the utility (transmission racks) 1 and 2. The transmission racks are connected to each other and each rack is connected to a set of subscribers 3.

For reasons related to the smoothing of the overall consumption of all the subscribers, the changing over to off-peak times or to peak times is not usually done simultaneously for all the subscribers of a distribution network. Indeed, if the changing over were to take place at the same instant and if the subscribers were to take advantage of the changing over to off-peak time in order to turn on water-heating installations, the demand for electricity on the network would rise instantaneously and there would be a risk of saturation of the network.

For this reason, the electrical power distributors generally stagger the change in pricing over a time slot, for example a half-hour slot, and the instant of the change in pricing is a function of the rack to which the subscriber in question is connected.

In practice, the pricing change in the subscribers' equipment is expressed by the sending of an information element on pricing from the transmission racks to this equipment. This information element is decoded at the remote-control relays and sent on to the counters, typically by the switching over of an indicator that increases or reduces the incrementation speed of the counter.

FIG. 2 shows an example of the encoding of pricing information. In this example, the information is encoded in RZ mode, on 8 bits A0, A1 ... to E0, E1. In practice, the information could comprise a greater number of bits (41 for example in a system used by the EDF), and could comprise data elements other than those related to an indication of a change in price. However, to be more concise, the description shall be limited to the 8 bits referred to. The 8 bits are assembled in four successive doublets of bits. Each doublet of bits (A0 and A1), (C0 and C1), (D0 and D1), (E0 and E1) is used to encode an instant of change in pricing. For example, a subscriber could be connected to a transmission rack for which the pricing changes are encoded on the first doublet (A0, A1). The EDF thus defines four groups of subscribers, each group being characterized by a given instant of change in pricing.

In each doublet, the second bit is used to provide information on the pricing change and the first bit is used to provide information on a continuation of pricing. In the above example, if the bit A0 is at 1, then there is no change in pricing, and if it is the bit A1 that is at 1, there is a change.

A bit at 1 is characterized by the presence of a modulation frequency of 175 Hz for 1.5 seconds and then by the absence of a modulation frequency for 1 second (RZ coding). A bit at 0 is characterized by the absence of a modulation frequency for 2.5 seconds.

In order to synchronize the reception and the processing of the bits received, the doublets are preceded by a synchronization bit BS which is in the state 1 for 2 seconds and in the state 0 for 1 second.

Assuming that the subscriber is connected to a transmission rack encoding the information on the first doublet (A0, A1), the change in price will be characterized by the reception of a series of doublets (01, 10, 10, 10). It is quite possible to conceive of a case where the information is encoded on only one doublet, with the pricing then changing for all the subscribers at the same instant. It can even be envisaged that the information will then be encoded on only one bit. As it happens, the invention is aimed at detecting and relaying the information on pricing change and cannot be limited by a particular information format. If a different series of doublets is received, the information on pricing change being, for example, encoded on the second doublet, it will not be taken into account for it indicates a pricing change for another group of subscribers.

In the electrical power distribution network, four information frames will be sent successively, each of them corresponding to the change in pricing of a group of subscribers according to the transmission racks to which they are connected (indeed, in practice, the number of racks is greater than the number of groups). The subscribers therefore receive the four successive information frames representing pricing changes for the different zones. In practice, each remote-control relay of a subscriber is designed to take account of one of the four different frames. A relay is said to be an A, C, D or E type of relay depending on whether it sends on the information on pricing change to the counter that is associated with it, after having received the first, second, third or fourth frame. In general, the remote-control relays are provided with a reading window used to read an information element indicating their type. This enables a maintenance technician for example to check the correspondence between the type of relay and the rack to which the subscriber is connected.

FIG. 3 gives a schematic view of a data transmission system in a domestic installation comprising a plurality of devices, AC, 10, 20, 30 distributed over an information medium, in this case the mains system. The transmission of information elements among the different units of the installation is therefore done solely by carrier current, through the power distribution network of the installation and not through a transmission line reserved for the flow of information elements. However, were such a line to exist, it could equally well be used for this purpose.

In one example, the information elements are transmitted from one device to the next one, on the mains system CP (by carrier current) by a modulation of two distinct frequencies (preferably having a modulation index of less than one). The binary information elements 0 and 1 are represented, for example, by the respective presence of a first modulation frequency of 132 kHz and a second modulation frequency of 133 kHz.

The information elements to be sent and received between the different devices are formatted according to an exchange protocol. FIG. 4 exemplifies the general structure of formatted information with notably a preamble PR, a header HDR, an address zone ADD comprising the address of the machine that has sent the information and the address of the addressee receiver, a data zone DATA and, as the case may be, an acknowledgment zone ACK in which the sender indicates his wish to receive or not to receive an acknowledgment message in response to the message sent.

In the example described, the element AC is designed to detect the presence of the pricing change information sent by the transmission rack to which the domestic installation is connected and to retransmit this information to this installation after a shaping operation according to the exchange protocol described here above.

For example, the device AC retransmits this information on pricing change to the device 10 which controls a programmed washing machine in such a way that it is turned on after a change to off-peak time.

The general constitution of the device AC and of the device 10 is given in FIG. 5.

The device AC preferably has a microprocessor-based circuit to send control signals to the device 10 and to receive and process the pricing change signals received from a transmission rack. This unit has its own working programs which may be controlled, for example, by the user by means of a panel MC comprising a keyboard and a control screen or else pushbuttons. It is also possible to plan the system so that the microprocessor-based circuit is controlled by a personal microcomputer, the user then being capable of defining operating programs of the microprocessor at will. For example, the user could decide to pass on the pricing change information to the counter only after having received the four pricing change information frames or else he may decide to pass on this information after having received a given frame if, by making a reading at the remote-control relay, he knows the group to which it is connected.

In addition to a microprocessor MP1 and its program and working memories MEM1, the device AC has the necessary means to produce the signals to be transmitted on the mains system towards the other devices of the installation. These means preferably have an oscillator OSC1 to produce a local carrier frequency (132±1 kHz). The output of the oscillator OSC1 is applied, through a mixer and modulator MODEM1, to a first amplifier AMP1, and the output of the amplifier AMP1 is applied to the secondary winding of a first transformer TR1 whose primary winding is connected to the mains.

The information elements that come from the mains system and represent a change in pricing arrive by a second transformer TR2. They are transmitted to a filtering cell FLT1 that enables the detection of the presence of a modulation (for example at 175 Hz) on the mains. The output of the filtering cell is connected to the input of a second amplifier AMP2, whose output is connected to the input of a demodulator MODEM2, whose output gives the microprocessor MP1 the pricing change information in digital form.

The device 10 similarly has reception and transmission means including, for example, a microprocessor MP3 and programming and working memories MEM3. It preferably has the means needed to receive and send signals on the mains system according to the defined exchange protocol. These means comprise an oscillator OSC3 to produce a local carrier frequency. The output of the oscillator is applied, through a modulator/demodulator MODEM3, to an amplifier AMP3, and the output of the amplifier AMP3 is applied to the primary winding of a transformer TR3 whose secondary winding is connected to the electrical power distribution network of the carrier current CP.

The information elements (132 or 133 kHz) that come from the mains system and are designed for this device 10 (these information elements being formatted according to the above-described exchange protocol) arrive by the transformer TR3. They are transmitted to a filtering cell FLT3 enabling the detection of the presence of a modulation on the information transmission medium. The output of the filtering cell is connected to the modulator/demodulator and shaped. The output of this circuit is connected to the microprocessor MP3. The signals received from the network of the other devices are demodulated and converted into sequences of binary pulses that can be used by the microprocessor MP3.

Thus, the device AC receives the pricing change information from the mains system by the second transformer TR2 and can retransmit it, formatted according to the exchange protocol, to the device 10 by means of the first transformer TR1.

It is possible to envisage an example where the device AC has only one transformer and where it has a structure comparable to that of the device 10. In this case, since the circuit is designed to receive a pricing information element according to a particular format and to retransmit it according to another format, it will be necessary to make provision, if the device AC is capable of receiving information elements formatted according to the exchange protocol, for means to recognize the speed of transmission of the received information elements, these means being interposed between the modulator/demodulator and the microprocessor of this device AC.

As an example, FIG. 6 shows a relaying apparatus having means REC for recognizing the speed of transmission. The estimation circuit DF, after having detected, for example, a message at the estimated speed of V1, switches a 16-bit multiplexer MUX to the pattern M1, which is then applied to a first input of a 16-bit digital comparator COMP. The digitized message coming from MODEM1 is applied to a 16-bit register REG, itself connected to a second input of the comparator COMP. The comparison is made when the 16 bits of the header HDR are present in the register REG. The comparator COMP then delivers a validation command OV, the value of which depends on the result of the comparison. If the content of the header HDR is identical to the pattern selected by the estimation means, in this case the pattern MA, the estimated speed is confirmed and the validation command OV has a value of 1, the message then being transmitted as a whole to the microprocessor MP1. Where the comparison is negative, the validation command OV is equal to 0 and the transmission of the message to the microprocessor MP1 is interrupted until the following sequence.

Although the invention has been described within the context of a mains type of transmission medium, it is quite possible to conceive of a case where the medium is different, using for example twisted pairs, coaxial cables, RF, etc. In this case, only the device AC will be connected by means of a transformer to the electrical power distribution network to receive the pricing change information from the transmission rack to which the subscriber is connected.

According to another disclosed class of innovative embodiments, there is provided: A home automation system comprising: one or more slave units, each connected to receive and decode commands received from said master unit and to correspondingly control a local device; a master unit, which is connected to receive and decode externally generated power-line data signals, in a first modulation standard, which are sent by the utility company to indicate pricing changes, and to send commands, in a second modulation standard, to command ones of said slave units to increase power consumption when said externally generated power-line data signals indicate that pricing has been reduced, and/or to command ones of said slave units to decrease power consumption when said externally generated power-line data signals indicate that pricing has been increased.

According to another disclosed class of innovative embodiments, there is provided: A power-line communications interface station comprising: circuitry for receiving and decoding externally generated power-line data signals, in a first modulation standard, which are sent by the utility company to indicate pricing changes; and circuitry for sending commands, in a second modulation standard, to command other stations to increase power consumption when said externally generated power-line data signals indicate that pricing has been reduced, and/or to command other stations to decrease power consumption when said externally generated power-line data signals indicate that pricing has been increased.

According to another disclosed class of innovative embodiments, there is provided: A system comprising a plurality of devices distributed on an information transmission medium and a communications machine comprising circuitry for the reception of information elements that are present in an electrical power distribution network and that represent a change in pricing system, wherein the communications machine includes means for transcribing the information elements on change in pricing system into information elements formatted according to an exchange protocol, and means for sending out these formatted information elements on the information transmission medium, and wherein the devices comprise means for receiving the formatted information elements sent by said means for sending.

According to another disclosed class of innovative embodiments, there is provided: A method of regulating power consumption in a home automation system, comprising the steps of: a.) receiving and decoding first data signals, said first data signals being externally generated signals which are sent out through a power-line in a first modulation standard and which are sent by the utility company to indicate pricing changes; b.) sending second data signals, which are in a second modulation standard, to indicate said pricing changes to devices which are connected to receive power from said power-line.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown. Many known circuits for providing a data interface over power lines can be used with the claimed inventions. Many implementations can be used to transmit a data format analogous to that of FIG. 4 over a network configuration analogous to that of FIG. 3, and the claimed inventions can be used with any of these.

What is claimed is:

1. A home automation system comprising:
   at least one slave unit connected to receive and decode commands and to correspondingly control a local device;
   a master unit in communication with the at least one slave unit to receive and decode externally generated power-line data signals in a first modulation standard sent by a utility company to indicate power pricing changes, to responsively translate said data signals according to an exchange protocol to produce said commands and to send said commands in a second modulation standard, and to responsively command the at least one slave unit to responsively change power consumption when said externally generated power-line data signals indicate that pricing has been changed.

2. The system of claim 1, wherein said master unit sends said commands through the local power wiring.

3. The system of claim 1, wherein said master unit sends said commands, solely by carrier current, through the local power wiring.

4. The system of claim 1, wherein said commands have a format which permits specification of a given device of the installation as the destination address.

5. The system of claim 1, wherein said commands have a format which permits specification of a set of devices of the installation as the destination address.

6. The system of claim 1, wherein said commands are transmitted in the form of messages digitized by frequency modulation.

7. A power-line communications interface station comprising:

circuitry for responsively receiving and decoding externally generated power-line data signals in a first modulation standard sent by a utility company to indicate power pricing changes and for responsively formatting said data signals according to an exchange protocol to produce commands which correspond at least in part to said data signals; and circuitry responsive to the receiving, decoding, and formatting circuitry for responsively sending said commands in a second modulation standard to command other stations to responsively increase power consumption when said externally generated power-line data signals indicate that power pricing has been reduced and to command other stations to responsively decrease power consumption when said externally generated power-line data signals indicate that power pricing has been increased.

8. The station of claim 7, wherein said circuitry for sending commands sends said commands through the local power wiring.

9. The station of claim 7, wherein said commands have a format which permits specification of a given device of the installation as the destination address.

10. The station of claim 7, wherein said commands have a format which permits specification of a set of devices of the installation as the destination address.

11. The station of claim 7, wherein said commands are transmitted in the form of messages digitized by frequency modulation.

12. The station of claim 7, wherein said circuitry for sending commands sends said commands, solely by carrier current, through the local power wiring.

13. A method of regulating power consumption in a home automation system, comprising the steps of:

a.) receiving and decoding first data signals, said first data signals being externally generated signals which are sent out through a power-line in a first modulation standard and which are sent by a utility company to indicate power pricing changes;

b.) responsively formatting said first data signals according to an exchange protocol to produce second data signals;

c.) responsively sending said second data signals in a second modulation standard to indicate said power pricing changes to devices which are connected to receive power from said power-line; and d.) responsively changing power consumption to in response to said second data signals in the second modulation standard.

14. The method of claim 13, wherein said step of sending data signals sends said signals through the local power wiring.

15. The method of claim 13, wherein said step of sending data signals sends said signals, solely by carrier current, through the local power wiring.

16. The method of claim 13, wherein said step of sending data signals sends said signals in a format which permits specification of a given device of the installation as the destination address.

17. The method of claim 13, wherein said step of sending data signals sends said signals in a format which permits specification of a set of devices of the installation as the destination address.

18. The method of claim 13, wherein said step of sending data signals sends said signals in the form of messages digitized by frequency modulation.

19. A system comprising a plurality of devices distributed on an information transmission medium; and a communications machine comprising circuitry for the reception of information elements that are present in an electrical power distribution network and that represent a change in a power pricing system, wherein the communications machine includes:

means responsive to the reception of information elements for processing and formatting the information elements on change in a power pricing system according to an exchange protocol, and means responsive to said process and formatting means for sending out these formatted information elements on the information transmission medium, and wherein the devices comprise means for receiving the formatted information elements sent by said means for sending and responsively changing power consumption thereto.

20. The system of claim 19, wherein the machine is liable to send out information elements dedicated to a given device of the installation.

21. The system of claim 19, wherein the machine is liable to send out information elements dedicated to a set of devices of the installation.

22. The system of claim 19, wherein the formatted information elements are transmitted in the installation in the form of messages digitized by frequency modulation.

23. The system of claim 19, wherein the information transmission medium is the electrical power distribution circuit.

24. The system of claim 19, wherein the devices furthermore include means for the transmission of formatted elements.

25. The system of claim 24, wherein the machine comprises means for receiving information elements formatted according to the exchange protocol.

26. The system of claim 25, wherein the machine includes means for recognizing the speed of transmission of the received information elements.

\* \* \* \* \*